United States Patent
Hong

(10) Patent No.: US 12,432,647 B2
(45) Date of Patent: Sep. 30, 2025

(54) METHODS FOR ACCESS CONTROL, AND COMMUNICATION DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 368 days.

(21) Appl. No.: 18/016,427

(22) PCT Filed: Aug. 12, 2020

(86) PCT No.: PCT/CN2020/108739
§ 371 (c)(1),
(2) Date: Jan. 16, 2023

(87) PCT Pub. No.: WO2022/032541
PCT Pub. Date: Feb. 17, 2022

(65) Prior Publication Data
US 2023/0189128 A1    Jun. 15, 2023

(51) Int. Cl.
*H04W 48/16* (2009.01)
*H04W 16/24* (2009.01)
(Continued)

(52) U.S. Cl.
CPC ........... *H04W 48/16* (2013.01); *H04W 16/24* (2013.01); *H04W 28/086* (2023.05); *H04W 84/042* (2013.01)

(58) Field of Classification Search
CPC ........... H04W 4/12; H04W 4/40; H04W 4/50; H04W 4/70; H04W 48/02; H04W 4/90;
(Continued)

(56) References Cited

U.S. PATENT DOCUMENTS 10,499,276 B2 * 12/2019 Chan ................. H04W 28/0289
10,652,702 B2 *  5/2020 Lu ........................... H04W 4/70
(Continued)

FOREIGN PATENT DOCUMENTS

| CN | 108574973 A | 9/2018 |
| CN | 110191309 A | 8/2019 |
| WO | 2017196246 A2 | 11/2017 |

OTHER PUBLICATIONS

International Search Report issued in Application No. PCT/CN2020/108739, dated Apr. 1, 2021, with English translation, (4p).
(Continued)

*Primary Examiner* — Jung Liu
(74) *Attorney, Agent, or Firm* — Arch & Lake LLP

(57) ABSTRACT

A method for access control is performed by a base station. The method includes: sending, by a base station, an access control configuration for a multi-modal service, the access control configuration being used for controlling an access initiation of a terminal which is based on the multi-modal service. Another method for access control is performed by a terminal. The method includes: receiving, by a terminal, an access control configuration for a multi-modal service, the access control configuration is configured to control an access initiation of the terminal, wherein the access initiation of the terminal which is based on the multi-modal service.

17 Claims, 7 Drawing Sheets

(51) Int. Cl.
*H04W 28/086* (2023.01)
*H04W 84/04* (2009.01)

(58) Field of Classification Search
CPC ... H04W 84/045; H04W 16/24; H04W 48/06; H04W 48/16; H04W 28/086; H04W 28/0942; H04W 88/06; H04W 48/12; H04W 84/042; H04W 84/18
See application file for complete search history.

(56) References Cited

U.S. PATENT DOCUMENTS

| | | | | |
|---|---|---|---|---|
| 11,172,400 | B2* | 11/2021 | Chan | H04L 47/11 |
| 11,240,737 | B2* | 2/2022 | Chun | H04W 74/0833 |
| 11,304,130 | B2* | 4/2022 | Pateromichelakis | H04W 48/06 |
| 2014/0161103 | A1* | 6/2014 | Sirotkin | H04W 36/0088 370/332 |
| 2015/0045041 | A1* | 2/2015 | Polisetty | H04W 88/06 455/445 |
| 2015/0119015 | A1 | 4/2015 | Gai et al. | |
| 2019/0104551 | A1 | 4/2019 | Deenoo et al. | |
| 2019/0259260 | A1* | 8/2019 | Amini | H04N 7/183 |
| 2019/0268732 | A1* | 8/2019 | Lu | H04W 4/12 |
| 2019/0281494 | A1* | 9/2019 | Chan | H04L 45/851 |
| 2020/0068430 | A1* | 2/2020 | Chan | H04W 28/0284 |
| 2023/0156571 | A1* | 5/2023 | Xu | H04W 76/19 370/328 |
| 2023/0156849 | A1* | 5/2023 | Xu | H04W 74/04 370/328 |

OTHER PUBLICATIONS

Supplementary European Search Report for EP application 20949040.8, dated Apr. 8, 2024, (14p).
CNOA issued in Application No. 202080001895.4 dated May 21, 2025 with English translation, (12p).

* cited by examiner

METHODS FOR ACCESS CONTROL, AND COMMUNICATION DEVICE

CROSS-REFERENCE TO RELATED APPLICATION

This application is the U.S. national phase application of International Application No. PCT/CN2020/108739, filed on Aug. 12, 2020, the entire disclosure of which is incorporated herein by reference for all purposes.

TECHNICAL FIELD

The present disclosure relates to but not limited to a field of wireless communication technologies, and particularly to a method and an apparatus for access control, a communication device and a storage medium.

BACKGROUND

Intelligent interaction refers to smart interaction between agents (including human beings and items). Most smart interactions between agents are passive, which depend on inputs of demands. Taking the inputs of demands in voice and visual interaction between human and a smart home product for example, these demands are single modal. With the evolution of wireless communication technology, multimodality will become common. That is, inputs through a plurality of devices or a plurality of inputs through one device are sent to a centralized processing device or function. The centralized processing device or function comprehensively processes these inputs, so as to obtain one or more outputs satisfying user demands. The plurality of outputs may also be performed by the plurality of devices or by the one device. A multi-modal service has a high requirement for a quality of service (QoS) of the network. However, access control of the multi-modal service may not satisfy the high requirement of the multi-modal service for the QoS.

SUMMARY

According to a first aspect of the present disclosure, a method for access control is performed by a base station. The method includes: sending an access control configuration for a multi-modal service; in which, the access control configuration is configured to control an access initiation of a terminal which is based on the multi-modal service.

According to a second aspect of the present disclosure, a method for access control is performed by a terminal. The method includes: receiving an access control configuration for a multi-modal service; in which the access control configuration is configured to control an access initiation of the terminal which is based on the multi-modal service.

According to a third aspect of the present disclosure, a communication device is provided, and includes: an antenna, a memory for storing computer instructions, and a processor connected to the antenna and the memory. The processor may be configured to control transceiving of the antenna. When the computer instructions are executed by the processor, the processor is caused to receive an access control configuration for a multi-modal service, in which the access control configuration is configured to control an access initiation of the communication device based on the multi-modal service.

DETAILED DESCRIPTION

Figure 1:
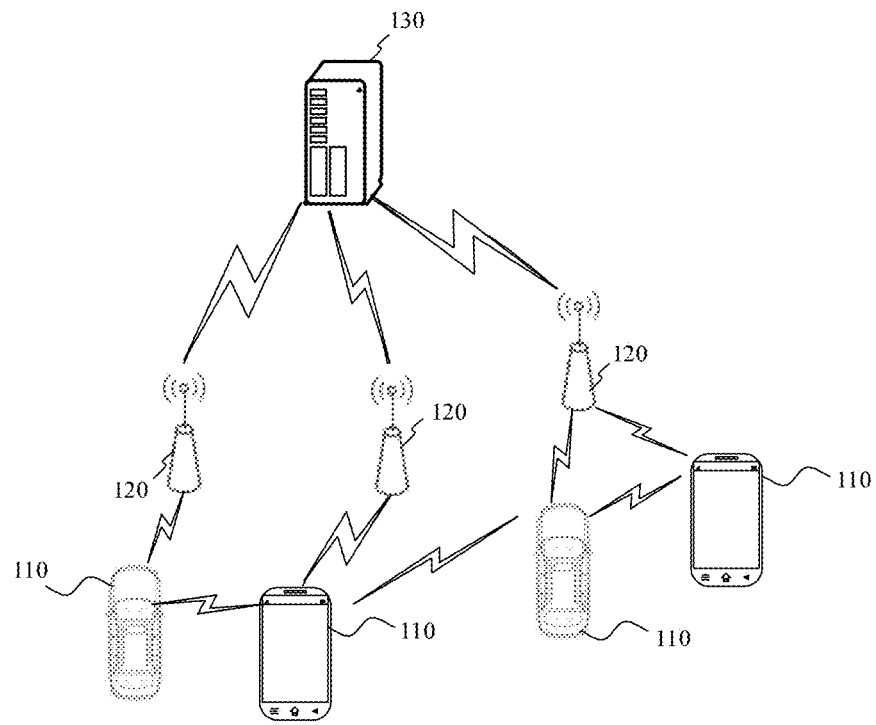
FIG. 1 is a diagram illustrating a structure of a wireless communication system.

The embodiments will be described in detail here, the examples of which are shown in the accompanying drawings. When the following descriptions refer to the accompanying drawings, unless otherwise indicated, the same numbers in different drawings represent the same or similar elements. The implementations described in the following embodiments do not represent all implementations consistent with embodiments of the present disclosure. Rather, they are merely examples of apparatuses and methods consistent with some aspects of the disclosure as recited in the appended claims.

The terms described in the embodiments of the present disclosure are only for the purpose of describing specific embodiments and are not intended to limit the embodiments of the present disclosure. The singular forms "a/an", "said" and "the" used in the embodiments of the disclosure and the appended claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in embodiments of the present disclosure to describe various information, such information should not be limited to these terms. These terms are only used to distinguish the same category of information. For example, without departing from the scope of embodiments of the present disclosure, first information may also be referred to as second information, and similarly, second information may also be referred to as first information, which depends on the context. For example, the word "if" as used herein may be interpreted as "in a case that" or "when" or "in response to determining".

The terms used herein are "greater than" or "less than" when representing a size relationship for purposes of conciseness and ease of understanding. However, it may be understood for those skilled in the art that the term "greater than" covers the meaning of "greater than or equal to", and "less than" covers the meaning of "less than or equal to".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In embodiments of the present disclosure, an access control configuration for a multi-modal service is sent, in which the access control configuration is configured to control an access initiation of a terminal which is based on the multi-modal service. As such, when the terminal receives the access control configuration sent by the base station, it may be determined whether an access based on the multi-modal service is initiated according to the indication of the access control configuration. Compared with the situation that the terminal randomly initiates the access based on the multi-modal service without receiving the access control configuration for the multi-modal service, a probability of resource collision during the random access after the access control is completed may be reduced, a success rate of the random access may be improved, a delay of the random access may be reduced, and thus a quality of service (QoS) of the multi-modal service may be improved.

FIG. 1 is a diagram illustrating a structure of a wireless communication system according to the embodiment of the present disclosure. As illustrated in FIG. 1, a wireless communication system is a communication system based on a cellular mobile communication technology. The wireless communication system may include several user equipment (UE) 110 and several base stations 120.

The UE 110 may refer to a device that provides voice and/or data connectivity for a user. The UE 110 may communicate with one or more core networks through a radio access network (RAN). The UE 110 may be internet of things UE, for example, a sensor device, a mobile phone (or referred to as a cellular phone) and a computer having the internet of things UE. For example, the UE 110 may be a fixed, portable, compact, handheld, computer built-in or vehicle-mounted device, such as, a station (STA), a subscriber unit, a subscriber station, a mobile station, a mobile, a remote station, an access point, a remote terminal, an access terminal, a user terminal, a user agent, a user device or UE. Alternatively, the UE 110 may be a device of an unmanned vehicle. Alternatively, the UE 110 also may be a vehicle-mounted device, for example, a vehicle computer with a wireless communication function, or a wireless user device externally connected to a vehicle computer. Alternatively, the UE 110 may also be a roadside device, for example, a street light, a signal light or other roadside device with a wireless communication function.

The base station 120 may be a network side device in the wireless communication system. The wireless communication system may be the 4th generation (4G) mobile communication system, which is also referred to as a long term evolution (LTE) system. Alternatively, the wireless communication system may be a 5G system, which is also referred to as a new radio (NR) system or a 5G NR system. Alternatively, the wireless communication system may be a next generation system of the 5G system. An access network in the 5G NR system may be referred to as a new generation-radio access network (NG-RAN), The base station 120 may be an evolved base station (eNB) adopted in the 4G system. Alternatively, the base station 120 may be a base station (gNB) with a centralized distributed architecture in the 5G system. When the base station 120 adopts the centralized distributed architecture, it generally includes a central unit (CU) and at least two distributed units (DU). Protocol stacks at a Packet Data Convergence Protocol (PDCP) layer, a Radio Link Control (RLC) layer and a Media Access Control (MAC) layer are configured in the CU. A physical (PHY) layer protocol is configured in the DU. The specific implementation of the base station 120 is not limited in the embodiment of the disclosure.

The base station 120 may establish a wireless connection with the UE 110 through a radio interface. In different implementations, the radio interface is one based on a 4G standard; or the radio interface is one based on a 5G standard, for example, a new radio interface; or the radio interface may be one based on a next generation mobile communication network technology standard of the 5G.

In some embodiments, an end to end (E2E) connection may also be established between UEs 110, which may be applied to scenes such as vehicle to vehicle (V2V) communication, vehicle to infrastructure (V2I) communication and vehicle to pedestrian (V2P) communication in vehicle to everything (V2X) communication.

The above user equipment may be referred to as terminal devices in the below embodiments.

In some embodiments, the wireless communication system may further include a network management device 130.

Several base stations 120 may be connected with a network management device 130. The network management device 130 may be a core network device in the wireless communication system. For example, the network management device 130 may be a mobility management entity (MME) in an evolved packet core (EPC). Alternatively, the network management device may be other core network device, for example, a Serving GateWay (SGW), a Public Data Network GateWay (PGW), a Policy and Charging Rules Function (PCRF) or a Home Subscriber Server (HSS). The implementation of the network management device 130 is not limited in the embodiments of the disclosure.

In order to facilitate understanding of any embodiment of the disclosure, an application scenario of the multi-modal service is explained first.

Figure 2:
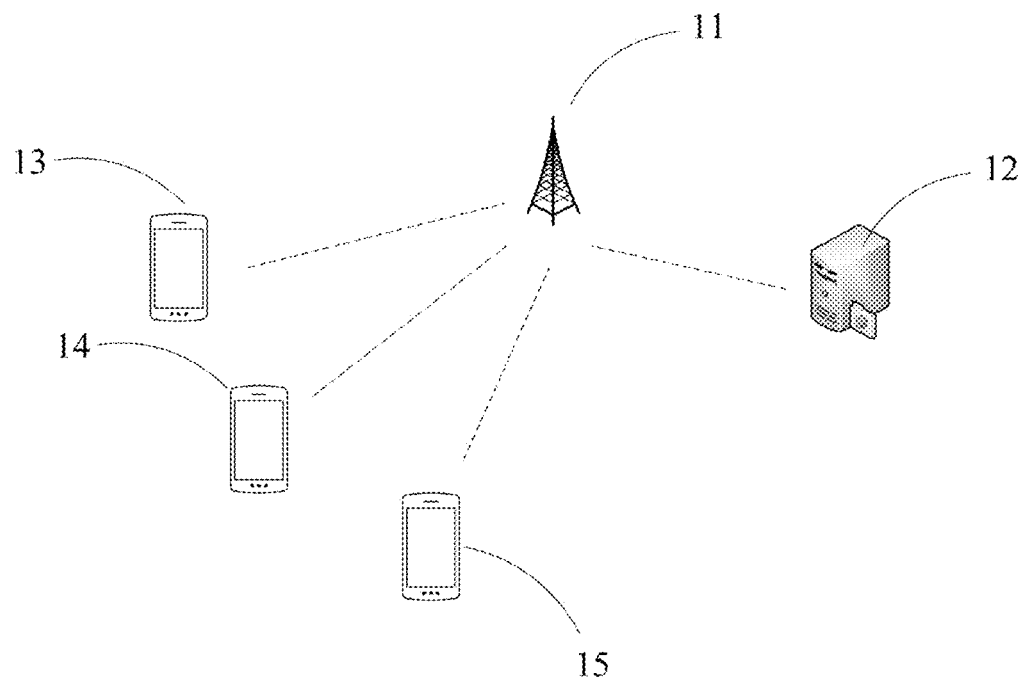
FIG. 2 is a flowchart illustrating a smart interaction scenario according to an embodiment.

As illustrated in FIG. 2, in an embodiment, a system of the multi-modal service includes a base station 11, a centralized processing device 12, a terminal 13, a terminal 14 and a terminal 15. In an embodiment, the terminal 13 and the terminal 14 are input devices of the multi-modal service, the centralized processing device 12 is a processing device of the multi-modal service, and the terminal 15 is an output device of the multi-modal service. The terminal 13 and/or the terminal 14 may perform data inputs in a plurality of modalities. For example, the terminal 13 and the terminal 14 may perform data transmissions in two different modalities, respectively. For example, the terminal 13 collects and uploads video data, and the terminal 14 collects and uploads audio data. The centralized processing device 12 may process the data input by both the terminal 13 and the terminal 14, and then send the processed data to the terminal 15. The data sent to the terminal 15 may be data outputs in the plurality of modalities. The centralized processing device 12 may process the input data using a machine learning algorithm, for example, using a neural network algorithm.

Before the terminal 13 and/or the terminal 14 send data to the centralized processing device 12 or before the centralized processing device 12 sends data to the terminal 15, radio resource control (RRC) connections need to be established between the terminal 13, the terminal 14, the terminal 15, and the centralized processing device 12 with the base station 11. A random access needs when establishing the RRC connection.

An access control function is a basic function of a wireless access network. In the LTE network, the access control function includes: a base station side broadcasts access control parameters by a system broadcast message, the terminal reads the access control parameters in the system broadcast message, and the terminal performs the access control based on the access control parameters.

Figure 3:
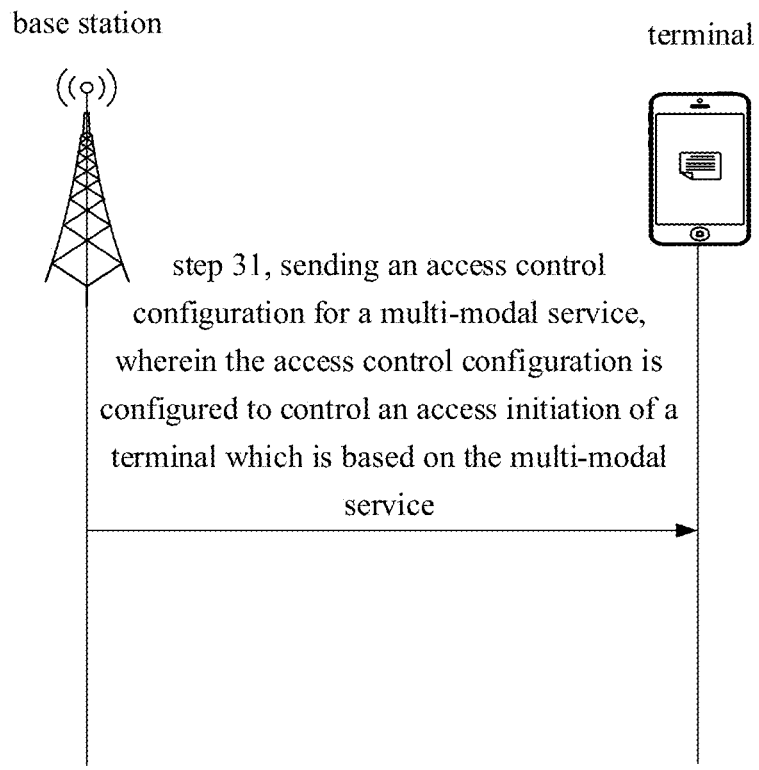
FIG. 3 is a flowchart illustrating a method for access control according to an embodiment.

As illustrated in FIG. 3, a method for access control is provided in the embodiment, which is applied to a base station. The method includes the following step.

At 31, an access control configuration for a multi-modal service is sent.

The access control configuration is configured to control an access initiation of a terminal which is based on the multi-modal service.

The base station is an interface device that enables the terminal to access the network. The base station may be various types of base stations, for example, a base station in a 3G network, a base station in a 4G network, a base station in a 5G network or other evolved base station.

In an embodiment, the terminal may be but not limited to a mobile phone, a wearable device, a vehicle-mounted terminal, a road side unit (RSU), a smart home terminal, an industrial sensing device and/or a medical device.

In an embodiment, the terminal may be one in a plurality of terminals corresponding to the multi-modal service. For example, the terminal may be the terminal 13 or 14 for data inputs of the multi-modal service in FIG. 2. The terminal may also be the terminal 15 for data outputs of the multi-modal service in FIG. 2.

In an embodiment, the multi-modal service may be a service that data inputs are performed in the plurality of modalities and/or a service that data outputs are performed in the plurality of modalities. Data inputs in the plurality of modalities may be performed through a plurality of terminals, respectively, or may be performed by a terminal. Data outputs in the plurality of modalities may be performed through a plurality of terminals respectively, or may be performed by a terminal. Data in a modality may be data having a preset feature. For example, data having a pose feature may be data in a modality, and data having a facial feature may be data in another modality.

In an embodiment, the base station may broadcast the access control configuration for the multi-modal service through a system message. After the base station broadcasts the access control configuration for the multi-modal service through the system message, the terminal reads the access control configuration in the system message, and then the terminal controls the access initiation based on the multi-modal service according to the access control configuration.

For example, the terminal controls the access initiation of the terminal which is based on the multi-modal service according to the access control configuration, which includes but not limited to:

initiating a random access process triggered by the multi-modal service when the access control configuration indicates that the terminal is allowed to initiate the access based on the multi-modal service;

and/or, disabling initiating a random access process triggered by the multi-modal service when the access control configuration indicates that the terminal is barred to initiate the access based on the multi-modal service.

In an embodiment, the base station may send the access control configuration for the multi-modal service to the terminal through a radio resource control (RRC) message in response to establishing the RRC connection with the terminal. The terminal reads the access control configuration in the RRC message, and controls the access initiation based on the multi-modal service according to the access control configuration. The access control configuration for the multi-modal service is sent using the RRC message, which enhances the compatibility of the RRC message.

In an embodiment, the base station may send the access control configuration for the multi-modal service when there is output data of the multi-modal service to be transmitted that needs to be sent to the terminal. In this way, when the terminal receives the access control configuration for the multi-modal service, the terminal may complete the access control based on the access control configuration, initiate the random access to establish the RRC connection between the terminal and the base station, and acquire output data of the multi-modal service to be transmitted from the base station in time.

In an embodiment, when the input data of the multi-modal service to be transmitted by the terminal needs to be sent to the base station, an acquisition request message of the access control configuration for the multi-modal service may be sent to the base station. The base station may send the access control configuration for the multi-modal service to the terminal when receiving the acquisition request message. In this way, the terminal may access the base station in time and send the input data of the multi-modal service to be transmitted to the base station when there is the input data of the multi-modal service to be transmitted. Then, the input data of the multi-modal service may be sent to a centralized processing device for processing via the base station.

In an embodiment, resource information that is used for the terminal to initiate the access based on the multi-modal service is carried in the access control configuration for the multi-modal service. The resource information may include a time-frequency domain resource and/or a preamble sequence for access. The access is initiated by the resource information carried in the access control configuration, which may reduce the interference caused by resource collision when different terminals perform data transmission using the resources.

In an embodiment, the multi-modal service may be a payment service with multi-party authentication. For example, when the terminal A needs to complete the payment service, face data of the terminal B and voice data of the terminal C need to be obtained for authentication. When the terminal A performs the payment service, the terminal A may send an authentication request to the base station through a core network. After the base station receives the authentication request, the base station may send the access control configuration for the multi-modal service to the terminal B and the terminal C that are in an idle state of the payment service. The terminal B and the terminal C may initiate the access based on the multi-modal service according to the access control configuration when receiving the access control configuration for the multi-modal service. After the terminal B and the terminal C get access to the network, the terminal B sends the face data to the base station and the terminal C sends the voice data to the base station.

In an embodiment, the access control configuration for the multi-modal service may be sent when it is detected that a multi-modal event occurs.

In an embodiment, when the multi-modal event occurs, a current moment may be a set moment. For example, a security service is a multi-modal service. In a security system, when the terminal reaches at the set moment, the terminal needs to transmit voice data and image data to a plurality of processing devices in the security service. At this time, the terminal may send the access control configuration for the multi-modal service before the set moment.

In an embodiment, different multi-modal services may be distinguished by identity identifiers (IDs). The IDs of different multi-modal services are different. For example, the ID of a first multi-modal service is "001", and the ID of a second multi-modal service is "010". In an embodiment, the ID of the multi-modal service is carried in the access control configuration for the multi-modal service. For example, ID of the multi-modal service for intelligent driving is "001", and ID information carrying "001" is carried in the access control configuration of the multi-modal service for intelligent driving. ID of the multi-modal service for a remote medical treatment is "010", and ID information carrying "010" is configured in the access control of the multi-modal service for the remote medical treatment. The terminal may determine whether the access control configuration is the access control configuration sent by the base station to the terminal when receiving the access control configuration according to different IDs.

In an embodiment, the access control configuration for the multi-modal service may be used to configure all terminals to bar the access initiation based on the multi-modal service, or configure all terminals to allow the access initiation based on the multi-modal service. For example, when the time-frequency resource that is used for the base station controlling the terminal to initiate an access based on the multi-modal service is greater than a resource threshold, all terminals may be allowed to initiate the access based on the multi-modal service. For example, when the time-frequency resource that is used for the base station controlling the terminal to initiate the access based on the multi-modal service the base station is less than the resource threshold, all terminals may be barred to initiate the access based on the multi-modal service.

In an embodiment, the access control configuration for the multi-modal service may be used to configure a part of terminals to bar the access initiation based on the multi-modal service or may be used configure a part of terminals to allow the access initiation based on the multi-modal service. For example, when the time-frequency resource that is used for the base station controlling the terminal to initiate the access based on the multi-modal service is greater than the resource threshold, the part of terminals may be allowed to initiate the access based on the multi-modal service. When the time-frequency resource that is used for the base station controlling the terminal to initiate the access based on the multi-modal service is less than the resource threshold, the part of terminals may be barred to initiate the access based on the multi-modal service.

In an embodiment, the access control configuration for the multi-modal service may be used to configure a priority of the terminal initiating the access based on the multi-modal service. For example, the priority of the first terminal initiating the access based on the multi-modal service is higher than the priority of the second terminal initiating the access based on the multi-modal service. The first terminal may preferentially initiate the access based on the multi-modal service compared with the second terminal.

In an embodiment, initiating the access based on the multi-modal service may be that the terminal initiates the random access based on the multi-modal service, to establish the RRC connection with the base station. The terminal of the multi-modal service triggers a random access process by means of initiating the random access to establish the RRC connection, thus achieving data transmission of the multi-modal service.

In an embodiment, an effective scope of the access control configuration for the multi-modal service is: an area including one or more cells. The area of one or more cells may be a signal coverage area of a terrestrial network or a non-terrestrial network. In an embodiment, the area including one or more cells is a signal coverage area of a public land mobile network (PLMN).

In the embodiment, after the terminal receives the access control configuration sent by the base station, the terminal may determine whether to initiate the access of the terminal which is based on the multi-modal service according to the indication of the access control configuration. Compared with the situation that the terminal randomly initiates the access based on the multi-modal service without receiving the access control configuration for the multi-modal service, the probability of the resource collision during the random access after the access control is completed may be reduced, the success rate of the random access may be improved, the delay of the random access may be reduced, and thus the quality of service (QoS) of the multi-modal service may be improved.

In an embodiment, the access control configuration for the multi-modal service includes:

a first access control factor, the first access control factor indicating that the terminal is allowed to initiate an access based on the multi-modal service or the first access control factor indicating that the terminal is barred to initiate an access based on the multi-modal service;

and/or, a second access control factor, the second access control factor indicating a probability that the terminal is allowed to initiate an access based on the multi-modal service.

In an embodiment, the first access control factor and/or the second access control factor may be carried in an indication field of a system information block (SIB). When a first identifier is carried in the indication field corresponding to the first access control factor, the terminal is allowed to initiate the access based on the multi-modal service; when a second identifier is carried in the indication domain corresponding to the first access control factor, the terminal is barred to initiate the access based on the multi-modal service.

In an embodiment, a cellbarred indication in the SIB is used to indicate the first access control factor. When the cellbarred indication is set as "barred", the terminal is barred to initiate the access based on the multi-modal service; when the cellbarred indication is set as "notbarred", the terminal is allowed to initiate the access based on the multi-modal service.

In an embodiment, an access control barring factor in the SIB is used to indicate a probability that the terminal is allowed to initiate the access based on the multi-modal service. The access control barring factor may be set as different probability values. For example, a first probability value, a second probability value and a third probability value. The probability value is within a set value range.

In an embodiment, when the terminal initiates the access based on the multi-modal service, a random number may be generated within the set value range. When the random number is greater than the probability value indicated by the access control factor, the terminal is allowed to initiate the access based on the multi-modal service; when the random number is less than the probability value indicated by the access control factor, the terminal is barred to initiate the access based on the multi-modal service. In this way, a number of terminals initiating the access based on the multi-modal service may be controlled, and a load of the base station may be reduced, which ensures a wireless communication quality of the multi-modal service when the terminal initiates the multi-modal service. The value range may be set between 0 and 1. The random number may be a value randomly generated between 0 and 1, such as 0.1, 0.3 or 0.4.

In an embodiment, only the first access control factor is carried in the access control configuration for the multi-modal service. In an embodiment, when an available radio resource of the base station is less than a resource threshold, the first access control factor indicates that the terminal is allowed to initiate the access based on the multi-modal service. When the available radio resource of the base station is greater than the resource threshold, the first access control factor indicates that the terminal is barred to initiate the access based on the multi-modal service.

In an embodiment, after the terminal receives the access control configuration, the terminal initiates the access based on the multi-modal service, in response to the access control configuration including the first access control factor indicating that the terminal is allowed to initiate the access based on the multi-modal service. After the terminal receives the access control configuration, the terminal disables initiating the access based on the multi-modal service, in response to the access control configuration including the first access control factor indicating that the terminal is barred to initiate the access based on the multi-modal service. In this way, the terminal may be allowed or barred to initiate the access based on the multi-modal service through the access control configuration, which ensures the QoS of the multi-modal service.

In an embodiment, only the second access control factor is carried in the access control configuration for the multi-modal service. The terminal may generate a random number within the set value range when receiving the access control configuration. The random access based on the multi-modal service is initiated in response to the random number being greater than or equal to the second access control factor, or initiating the random access is disabled based on the multi-modal service in response to the random number being less than the second access control factor. In this way, the number of terminals initiating the access based on the multi-modal service may be controlled, and the load of the base station may be reduced, which ensures the QoS of the multi-modal service when the terminal initiates the multi-modal service.

In an embodiment, the first access control factor and the second access control factor are simultaneously carried in the access control configuration for the multi-modal service. After the terminal receives the access control configuration, the terminal disables initiating the access based on the multi-modal service, in response to the access control configuration including the first access control factor indicating that the terminal is barred to initiate the access based on the multi-modal service. The random number may be generated within the set value range, in response to the access control configuration including the first access control factor indicating that the terminal is allowed to initiate the access based on the multi-modal service. The random access based on the multi-modal service is initiated in response to the random number being greater than or equal to the second access control factor, or initiating the random access based on the multi-modal service is disabled in response to the random number being less than the second access control factor. In this way, the control of barring or allowing the terminal to initiate the access based on the multi-modal service may be more refined, which ensures the QoS of the multi-modal service when the terminal initiates the multi-modal service.

Figure 4:
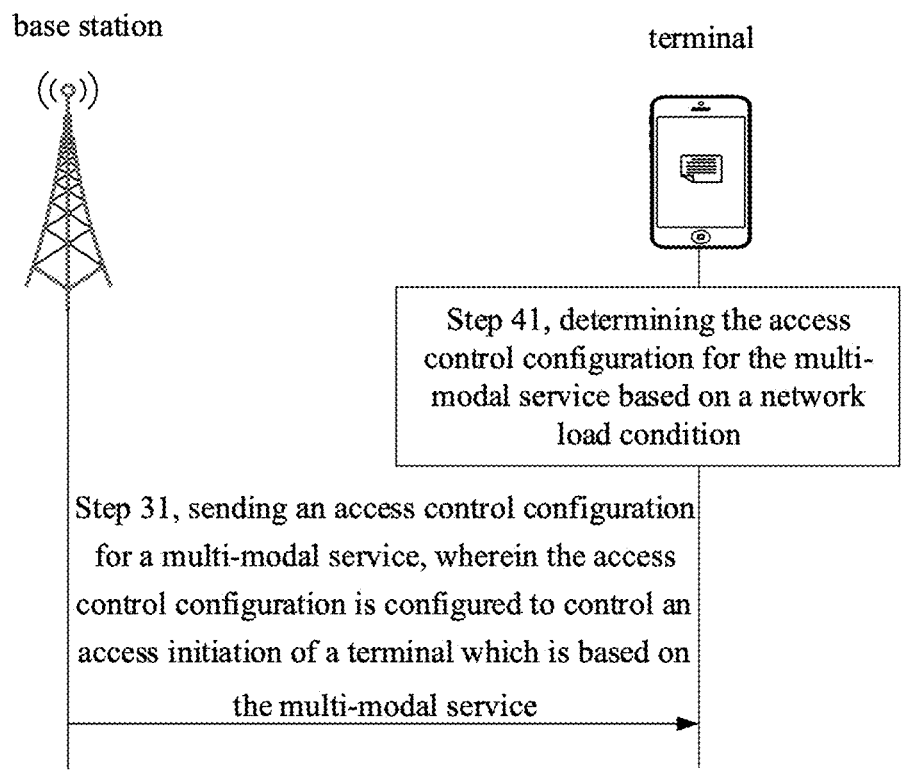
FIG. 4 is a flowchart illustrating a method for access control according to an embodiment.

As illustrated in FIG. 4, a method for access control is provided in the embodiment. The method includes the following step.

At step 41, the access control configuration for the multi-modal service is determined based on a network load condition.

The network load condition may be described by at least one of:
  a number of terminals connected to a network;
  a number of remaining available resources of the network;
  a load rate ratio of a current load rate of the terminal to a rated load rate of the terminal; or
  a ratio of a current capacity of the network to a rated capacity of the network.

In an embodiment, when the number of terminals connected to the base station is greater than a number threshold, the network load condition is a first condition; when the number of terminals connected to the base station is less than the number threshold, the network load condition is a second condition. When the network load condition is the first condition, the initiation based on the multi-modal service may barred, which relieves an overload of the network may be relieved, and ensures the QoS of the multi-modal service. When the network load condition is the second condition, the terminal may be allowed to initiate the access based on the multi-modal service, which enhances a utilization rate of radio resources.

In an embodiment, the number of remaining available resources may be a number of radio resources that may be scheduled by the base station for communication. When the number of radio resources that may be scheduled by the base station for communication is greater than a set resource threshold, the network load condition is a third condition; when the number of radio resources that may be scheduled by the base station for communication is less than the set resource threshold, the network load condition is a fourth condition. When the network load condition is the third condition, the terminal may be allowed to initiate the access based on the multi-modal service, which enhances the utilization rate of radio resources. When the network load condition is the fourth condition, the terminal may be barred to initiate the access based on the multi-modal service, which relieves the overload of the network, and ensures the QoS of the multi-modal service.

In an embodiment, when the load rate ratio of the current load rate of the terminal to the rated load rate of the terminal is within a threshold range, the network load condition is a fifth condition. When the network load condition is the fifth condition, a part of terminals may be allowed to initiate the access based on the multi-modal service. It may be indicated that the terminal is allowed to initiate the access based on the multi-modal service, and a probability may also be indicated that the terminal initiates the access based on the multi-modal service. The terminal may generate a random number within a set value range when receiving the access control configuration. The access of the multi-modal service is initiated in response to the random number being greater than or equal to the probability, or initiating the access based on the multi-modal service is disabled in response to the random number being less than the probability. In this way, the base station may only allow the part of terminals for access, thus controlling the number of terminals initiating the access based on the multi-modal service, so that the control of allowing the access initiation of the terminal which is based on the multi-modal service may be more refined.

In an embodiment, determining the access control configuration for the multi-modal service based on the network load condition includes at least one of:

determining that the access control configuration includes the first access control factor indicating that the terminal is allowed to initiate the access based on the multi-modal service, in response to determining that the network provides the multi-modal service based on the network load condition;

determining that the access control configuration includes the first access control factor indicating that the terminal is barred to initiate the access based on the multi-modal service, in response to determining that the network does not provide the multi-modal service based on the network load condition;

determining that the access control configuration includes the second access control factor, in response to determining that the network provides a part of the multi-modal service based on the network load condition; or determining that the access control configuration includes the first access control factor indicating that the terminal is allowed to initiate the access based on the multi-modal service and the second access control factor, in response to determining that the network provides a part of the multi-modal service based on the network load condition.

In an embodiment, when the number of terminals connected to the base station is greater than the number threshold or the radio resource that may be scheduled by the base station for communication is less than the set resource threshold, it is determined that the network does not provide the multi-modal service.

In an embodiment, in response to the number of terminals connected to the base station being greater than the number threshold or the radio resource that may be scheduled by the base station for communication being less than the set resource threshold, it is determined that the access control configuration includes the first access control factor indicating that the terminal is barred to initiate the access based on the multi-modal service.

In an embodiment, when the number of the terminals connected to the base station is less than the number threshold or the radio resource that may be scheduled by the base station for communication is greater than the set resource threshold, it is determined that the network provides the multi-modal service.

In an embodiment, in response to the number of the terminals connected to the base station being less than the number threshold or the radio resource that may be scheduled by the base station for communication being greater than the set resource threshold, it is determined that the access control configuration includes the first access control factor indicating that the terminal is allowed to initiate the access based on the multi-modal service.

In an embodiment, the network provides the part of the multi-modal service, which means that the network may provide the multi-modal service for the part of the terminals. For example, there are N terminals that need to initiate the access based on the multi-modal service, while M terminals among the N terminals are allowed to initiate the access based on the multi-modal service. M is greater than N, and M and N are positive integers.

In an embodiment, in response to the network providing the multi-modal service for the part of the terminals, it is determined that the access control configuration includes the second access control factor; and in response to the network providing the multi-modal service for the part of the terminal, it is determined that the access control configuration includes the first access control factor indicating that the terminal is allowed to initiate the access based on the multi-modal service and the second access control factor.

Figure 5:
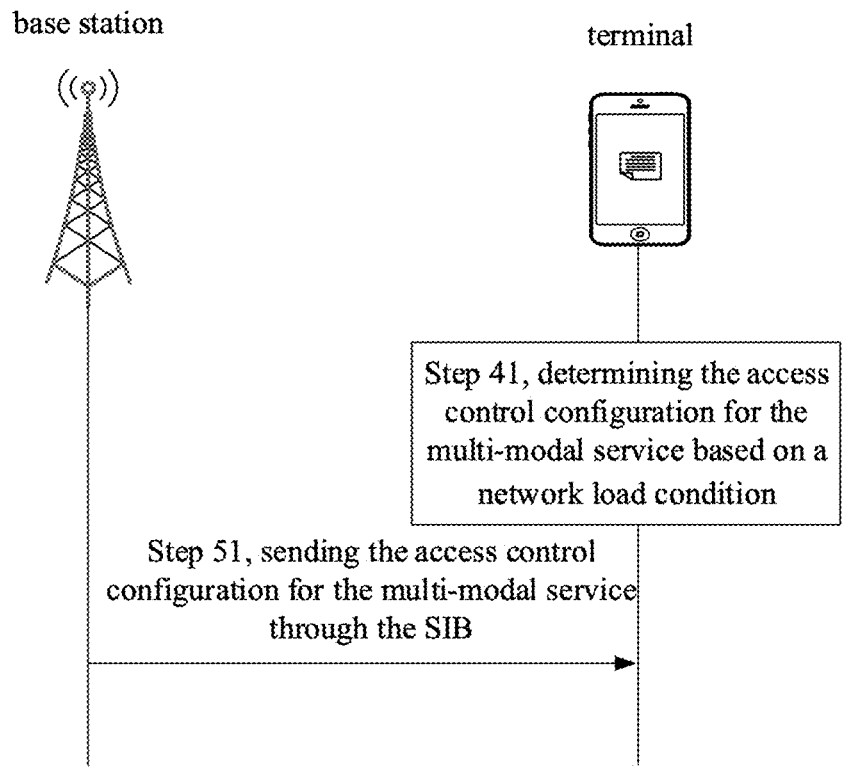
FIG. 5 is a flowchart illustrating a method for access control according to an embodiment.

As illustrated in FIG. 5, a method for access control is provided in the embodiment. The method includes the following step.

At 51, the access control configuration for the multi-modal service is sent through the SIB.

The access control configuration for the multi-modal service may be sent through an SIB1 and/or an SIB2.

In an embodiment, different access control factors in the access control configuration may be carried in different SIBs. For example, the first access control factor is carried in the SIB1, and the second access control factor is carried in the SIB2. The SIB1 may be sent first, and then the SIB2 may be sent. The signaling structures of the SIB1 and the SIB2 are illustrated as follows:

In an embodiment, the signaling structure of the SIB1 is:

```
SystemInformationBlockType1 ::=    SEQUENCE {
    ...
    cellBarred_MMX                 ENUMERATED {barred, notBarred},
    cellBarred_MMY                 ENUMERATED {barred, notBarred},
    ...   }
```

Here, different multi-modal services may be distinguished by different identifiers. For example, "MMX" is an identifier of the first multi-modal service, and "MMY" is an identifier of the second multi-modal service. The SIB1 may include all identifiers of the multi-modal services that need to be configured and are associated with the access control configuration. For example, the SIB1 may further include an identifier "MMZ" of a third multi-modal service and an identifier "MMX" of a fourth multi-modal service. The first access control factor is carried in the SIB1. The first access control factor of the first multi-modal service is defined by "cellBarred_MMX ENUMERATED {barred, notBarred}", and the first access control factor of the second multi-modal service is defined by "cellBarred_MMY ENUMERATED {barred, notBarred}". "barred" corresponds to indicating that the terminal is barred to initiate the access based on the multi-modal service. "notBarred" corresponds to indicating that the terminal is allowed to initiate the access based on the multi-modal service.

In an embodiment, the signaling structure of the SIB2 is:

```
    SystemInformationBlockType2 ::=    SEQUENCE {
        ...
        ac-BarringForMMX         AC-BarringConfig         OPTIONAL,    -- Need OP
        ac-BarringForMMY         AC-BarringConfig         OPTIONAL     -- Need OP
    }
    AC-BarringConfig ::=         SEQUENCE {
        ac-BarringFactor         ENUMERATED {p00, p05, p10, p15, p20, p25, p30, p40,p50, p60, p70, p75,
p80, p85, p90, p95},
        ... }
```

Here, different multi-modal services may be distinguished by different identifiers. For example, "MMX" is the identifier of the first multi-modal service, and "MMY" is the identifier of the second multi-modal service. The SIB1 may include all identifiers of the multi-modal services that need to be configured and are associated with the access control configuration. For example, the SIB1 may further include the identifier "MMZ" of the third multi-modal service and the identifier "MMX" of the fourth multi-modal service. The second access control factor is carried in the SIB2. The second access control factor of the first multi-modal service is defined by "ac-BarringForMMX AC-BarringConfig OPTIONAL, —Need OP", and the second access control factor of the second multi-modal service is defined by "ac-BarringForMMY AC-BarringConfig OPTIONAL—Need OP". The specific probability values may be selected from P00 to P95 in "ac-BarringFactor ENUMERATED {p00, p05, p10, p15, p20, p25, p30, p40, p50, p60, p'70, p'75, p80, p85, p90, p95}".

In an embodiment, different access control factors in the access control configuration may be carried in the same SIB. For example, the first access control factor and the second access control factor are carried in the SIB1, the signaling structure of which is illustrated:

In an embodiment, the signaling structure of the SIB1 is:

```
    SystemInformationBlockType1 ::=    SEQUENCE {
        ...
        cellBarred_MMX                   ENUMERATED {barred, notBarred},
        cellBarred_MMY                   ENUMERATED {barred, notBarred},
        ...
        ac-BarringForMMX         AC-BarringConfig         OPTIONAL,    -- Need OP
        ac-BarringForMMY         AC-BarringConfig         OPTIONAL     -- Need OP
        ...
        ac-BarringFactor         ENUMERATED {p00, p05, p10, p15, p20, p25, p30, p40,p50, p60, p70, p75,
p80, p85, p90, p95},    }
```

Here, different multi-modal services may be distinguished by different identifiers. For example, "MMX" is the identifier of the first multi-modal service, and "MMY" is the identifier of the second multi-modal service. The SIB1 may include all identifiers of the multi-modal services that need to be configured and are associated with the access control configuration. For example, the SIB1 may further include the identifier "MMZ" of the third multi-modal service and the identifier "MMX" of the fourth multi-modal service. The first access control factor is carried in the SIB1. The first access control factor of the first multi-modal service is defined by "cellBarred_MMX ENUMERATED {barred, notBarred}", and the first access control factor of the second multi-modal service is defined by "cellBarred_MMY ENUMERATED {barred, notBarred}". "barred" corresponds to indicating that the terminal is barred to initiate the access based on the multi-modal service. "notBarred" corresponds to indicating that the terminal is allowed to initiate the access based on the multi-modal service. The second access control factor is carried in the SIB1. The second access control factor of the first multi-modal service is defined by "ac-BarringForMMX AC-BarringConfig OPTIONAL, —Need OP", and the second access control factor of the second multi-modal service is defined by "ac-BarringForMMY AC-BarringConfig OPTIONAL—Need OP". The specific probability values may be selected from P00 to P95 in "ac-BarringFactor ENUMERATED {p00, p05, p10, p15, p20, p25, p30, p40, p50, p60, p'70, p'75, p80, p85, p90, p95}".

Figure 6:
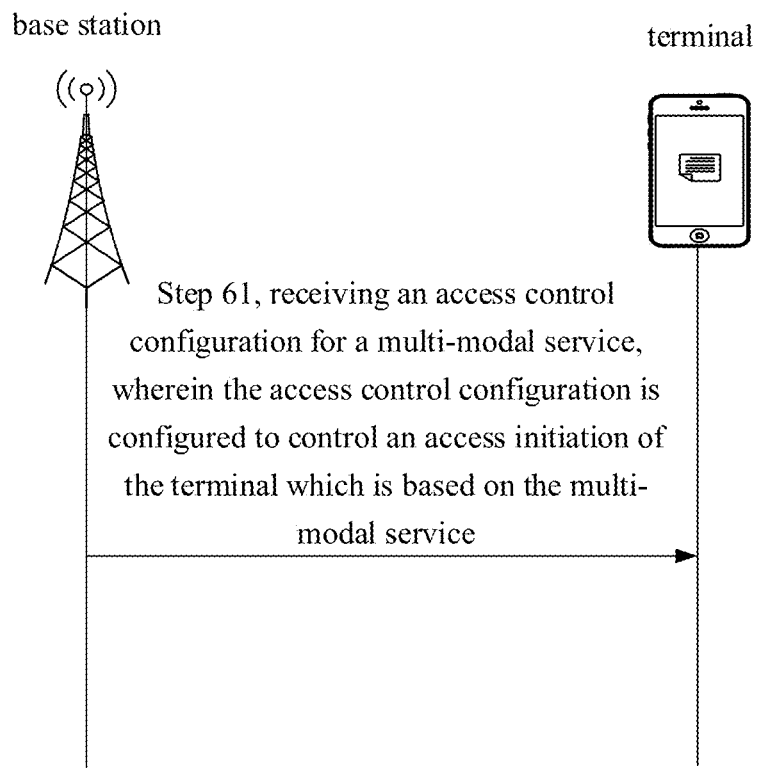
FIG. 6 is a flowchart illustrating a method for access control according to an embodiment.

As illustrated in FIG. 6, a method for access control is provided in the embodiment, which is applied to a terminal. The method includes the following step.

At 61, an access control configuration for a multi-modal service is received;

the access control configuration is configured to control an access initiation of the terminal which is based on the multi-modal service.

In an embodiment, the base station is an interface device that enables the terminal to access the network. The base station may be various types of base stations, for example, a base station in a 3G network, a base station in a 4G network, a base station in a 5G network or other evolved base station.

In an embodiment, the terminal may be but not limited to a mobile phone, a wearable device, a vehicle terminal, a road side unit (RSU), a smart home terminal, an industrial sensing device and/or a medical device.

In an embodiment, the terminal may be one in a plurality of terminals corresponding to the multi-modal service. For example, the terminal may be the terminal 12 for data inputs of the multi-modal service in FIG. 2. The terminal may also be the terminal 15 for data outputs of the multi-modal service in FIG. 2.

In an embodiment, the multi-modal service may be a service that data inputs are performed in the plurality of modalities and/or a service that data outputs are performed in the plurality of modalities. Data inputs in the plurality of modalities may be performed through a plurality of terminals, respectively, or may be performed by a terminal. Data outputs in the plurality of modalities may be performed through a plurality of terminals respectively, or may be performed by a terminal. Data in a modality may be data having a preset feature. For example, data having a pose feature may be data in a modality, and data having a facial feature may be data in another modality.

In an embodiment, the base station may broadcast the access control configuration for the multi-modal service through a system message. After the base station broadcasts the access control configuration for the multi-modal service through the system message, the terminal reads the access control configuration in the system message, and then the terminal controls the access initiation based on the multi-modal service according to the access control configuration.

For example, the terminal controls the access initiation of the terminal which is based on the multi-modal service according to the access control configuration, which includes but not limited to:

initiating a random access process triggered by the multi-modal service when the access control configuration indicates that the terminal is allowed to initiate the access based on the multi-modal service;

and/or, disabling initiating a random access process triggered by the multi-modal service when the access control configuration indicates that the terminal trigger is barred to initiate the access based on the multi-modal service.

In an embodiment, the base station may send the access control configuration for the multi-modal service to the terminal through a radio resource control (RRC) message in response to establishing the RRC connection with the terminal. The terminal reads the access control configuration in the RRC message, and controls the access initiation based on the multi-modal service according to the access control configuration. The access control configuration for the multi-modal service is sent using the RRC message, which enhances the compatibility of the RRC message.

In an embodiment, the base station may send the access control configuration for the multi-modal service when there is output data of the multi-modal service to be transmitted that needs to be sent to the terminal. In this way, when the terminal receives the access control configuration for the multi-modal service, the terminal may complete the access control based on the access control configuration, initiate the random access to establish an RRC connection between the terminal and the base station, and acquire output data of the multi-modal service to be transmitted from the base station in time.

In an embodiment, when the input data of the multi-modal service to be transmitted by the terminal needs to be sent to the base station, an acquisition request message of the access control configuration for the multi-modal service may be sent to the base station. The base station may send the access control configuration for the multi-modal service to the terminal when receiving the acquisition request message. In this way, the terminal may access the base station in time and send the input data of the multi-modal service to be transmitted to the base station when there is the input data of the multi-modal service to be transmitted. Then, the input data of the multi-modal service may be sent to a centralized processing device for processing via the base station.

In an embodiment, resource information that is used for the terminal to initiate the access based on the multi-modal service is carried in the access control configuration for the multi-modal service. The resource information may include a time-frequency domain resource and/or a preamble sequence for access. The access is initiated by the resource information carried in the access control configuration, which may reduce the interference caused by resource collision when different terminals perform data transmission using the resources.

In an embodiment, the multi-modal service may be a payment service with multi-party authentication. For example, when the terminal A needs to complete the payment service, face data of the terminal B and voice data of the terminal C need to be obtained for authentication. When the terminal A performs the payment service, the terminal A may send an authentication request to the base station through a core network. After the base station receives the authentication request, the base station may send the access control configuration for the multi-modal service to the terminal B and the terminal C that are in an idle state of the payment service. The terminal B and the terminal C may initiate the access based on the multi-modal service based on the access control configuration when receiving the access control configuration for the multi-modal service. After the terminal B and the terminal C get access to the network, the terminal B sends the face data to the base station and the terminal C sends the voice data to the base station.

In an embodiment, the access control configuration for the multi-modal service may be sent when it is detected that a multi-modal event occurs.

In an embodiment, when the multi-modal event occurs, a current moment may be a set moment. For example, a security service is a multi-modal service. In a security system, when the terminal reaches at the set moment, the terminal needs to transmit voice data and image data to a plurality of processing devices in the security service. At this time, the terminal may send the access control configuration for the multi-modal service before the set moment.

In an embodiment, different multi-modal services may be distinguished by identity identifiers (IDs). The IDs of different multi-modal services are different. For example, the ID of a first multi-modal service is "001", and the ID of a second multi-modal service is "010". In an embodiment, the ID of the multi-modal service is carried in the access control configuration for the multi-modal service. For example, ID of the multi-modal service for intelligent driving is "001", and ID information carrying "001" is carried in the access control configuration of the multi-modal service for intelligent driving. ID of the multi-modal service for a remote medical treatment is "010", and ID information carrying "010" is configured in the access control of the multi-modal service for the remote medical treatment. The terminal may determine whether the access control configuration is the access control configuration sent by the base station to the terminal when receiving the access control configuration according to different IDs.

In an embodiment, the access control configuration for the multi-modal service may be used to configure all terminals to bar the access initiation based on the multi-modal service, or configure all terminals to allow the access initiation based on the multi-modal service. For example, when the time-frequency resource that is used for the base station controlling the terminal to initiate an access based on the multi-modal service is greater than a resource threshold, all terminals may be allowed to initiate the access based on the multi-modal service. For example, when the time-frequency resource that is used for the base station controlling the terminal to initiate the access based on the multi-modal service is less than the resource threshold, all terminals may be barred to initiate the access based on the multi-modal service.

In an embodiment, the access control configuration for the multi-modal service may be used to configure a part of terminals to bar the access initiation based on the multi-modal service or may be used to configure a part of terminals to allow the access initiation based on the multi-modal service. For example, when the time-frequency resource that is used for the base station controlling the terminal to initiate the access based on the multi-modal service is greater than the resource threshold, the part of terminals may be allowed to initiate the access based on the multi-modal service. When the time-frequency resource that is used for the base station controlling the terminal to initiate the access based on the multi-modal service is less than the resource threshold, the part of terminals may be barred to initiate the access based on the multi-modal service.

In an embodiment, the access control configuration for the multi-modal service may be configured to configure a priority for initiating the access based on the multi-modal service. For example, the priority of the first terminal initiating the access based on the multi-modal service is higher than the priority of the second terminal initiating the access based on the multi-modal service. The first terminal may preferentially initiate the access based on the multi-modal service compared with the second terminal.

In an embodiment, initiating the access based on the multi-modal service may be that the terminal initiates the random access based on the multi-modal service, to establish the RRC connection with the base station. The terminal of the multi-modal service triggers a random access process by means of initiating the random access to establish the RRC connection, thus achieving data transmission of the multi-modal service.

In an embodiment, an effective scope of the access control configuration for the multi-modal service is: an area including one or more cells. The area of one or more cells may be a signal coverage area of a terrestrial network or a non-terrestrial network. In an embodiment, the area including one or more cells is a signal coverage area of a public land mobile network (PLMN).

In the embodiment, after the terminal receives the access control configuration sent by the base station, the terminal may determine whether the access of the terminal which is based on the multi-modal service is initiated according to the indication of the access control configuration. Compared with the situation that the terminal randomly initiates the access based on the multi-modal service without receiving the access control configuration for the multi-modal service, the probability of the resource collision during the random access after the access control is completed may be reduced, the success rate of the random access may be improved, the delay of the random access may be reduced, and thus the quality of service (QoS) of the multi-modal service may be improved.

In an embodiment, the access control configuration for the multi-modal service includes:
  a first access control factor, the first access control factor indicating that the terminal is allowed to initiate an access based on the multi-modal service or the first access control factor indicating that the terminal is barred to initiate an access based on the multi-modal service;
  and/or,
  a second access control factor, the second access control factor indicating a probability that the terminal is allowed to initiate an access based on the multi-modal service.

In an embodiment, the first access control factor and/or the second access control factor may be carried in an indication field of a system information block (SIB). When a first identifier is carried in the indication field corresponding to the first access control factor, the terminal is allowed to initiate the access based on the multi-modal service; when a second identifier is carried in the indication domain corresponding to the first access control factor, the terminal is barred to initiate the access based on the multi-modal service.

In an embodiment, a cellbarred indication in the SIB is used to indicate the first access control factor. When the cellbarred indication is set as "barred", the terminal is barred to initiate the access based on the multi-modal service; when the cellbarred indication is set as "notbarred", the terminal is allowed to initiate the access based on the multi-modal service.

In an embodiment, an access control barring factor in the SIB is used to indicate a probability that the terminal is allowed to initiate the access based on the multi-modal service. The access control barring factor may be set as different probability values. For example, a first probability value, a second probability value and a third probability value. The probability value is within a set value range.

In an embodiment, when the terminal initiates the access based on the multi-modal service, a random number may be generated within the set value range. When the random number is greater than the probability value indicated by the access control factor, the terminal is allowed to initiate the service based on the multi-modal service; when the random number is less than the probability value indicated by the access control factor, the terminal is barred to initiate the access based on the multi-modal service. In this way, the number of terminals initiating the access based on the multi-modal service may be controlled, and the load of the base station may be reduced, which ensures the wireless communication quality of the multi-modal service when the terminal initiates the multi-modal service. The value range may be set between 0 and 1. The random number may be a value randomly generated between 0 and 1, such as 0.1, 0.3 or 0.4.

In an embodiment, only the first access control factor is carried in the access control configuration for the multi-modal service. In an embodiment, when an available radio resource of the base station is less than a resource threshold, the first access control factor indicates that the terminal is allowed to initiate the access based on the multi-modal service. When the available radio resource of the base station is greater than the resource threshold, the first access control factor indicates that the terminal is barred to initiate the access based on the multi-modal service.

In an embodiment, after the terminal receives the access control configuration, the terminal initiates the access based on the multi-modal service, in response to the access control configuration including the first access control factor indicating that the terminal is allowed to initiate the access based on the multi-modal service. After the terminal receives the access control configuration, the terminal disables initiating the access based on the multi-modal service, in response to the access control configuration including the first access control factor indicating that the terminal is barred to initiate the access based on the multi-modal service. In this way, the terminal may be allowed or barred to initiate the access based on the multi-modal service through the access control configuration, which ensures the QoS of the multi-modal service.

In an embodiment, only the second access control factor is carried in the access control configuration for the multi-modal service. The terminal may generate a random number within a set value range when receiving the access control configuration. The random access based on the multi-modal service is initiated in response to the random number being greater than or equal to the second access control factor, or initiating the random access based on the multi-modal service is disabled in response to the random number being less than the second access control factor. In this way, the number of terminals initiating the access based on the multi-modal service may be controlled, and the load of the base station may be reduced, which ensures the QoS of the multi-modal service when the terminal initiates the multi-modal service.

In an embodiment, the first access control factor and the second access control factor are simultaneously carried in the access control configuration for the multi-modal service. After the terminal receives the access control configuration, the terminal disables initiating the access based on the multi-modal service, in response to the access control configuration including the first access control factor indicating that the terminal is barred to initiate the access based on the multi-modal service. The random number may be generated within the set value range, in response to the access control configuration including the first access control factor indicating that the terminal is allowed to initiate the access based on the multi-modal service. The random access based on the multi-modal service is initiated in response to the random number being greater than or equal to the second access control factor, or initiating the random access based on the multi-modal service is disabled in response to the random number being less than the second access control factor. In this way, the control of barring or allowing the terminal to initiate the access based on the multi-modal service may be more refined, which ensures the QoS of the multi-modal service when the terminal initiates the multi-modal service.

Figure 7:
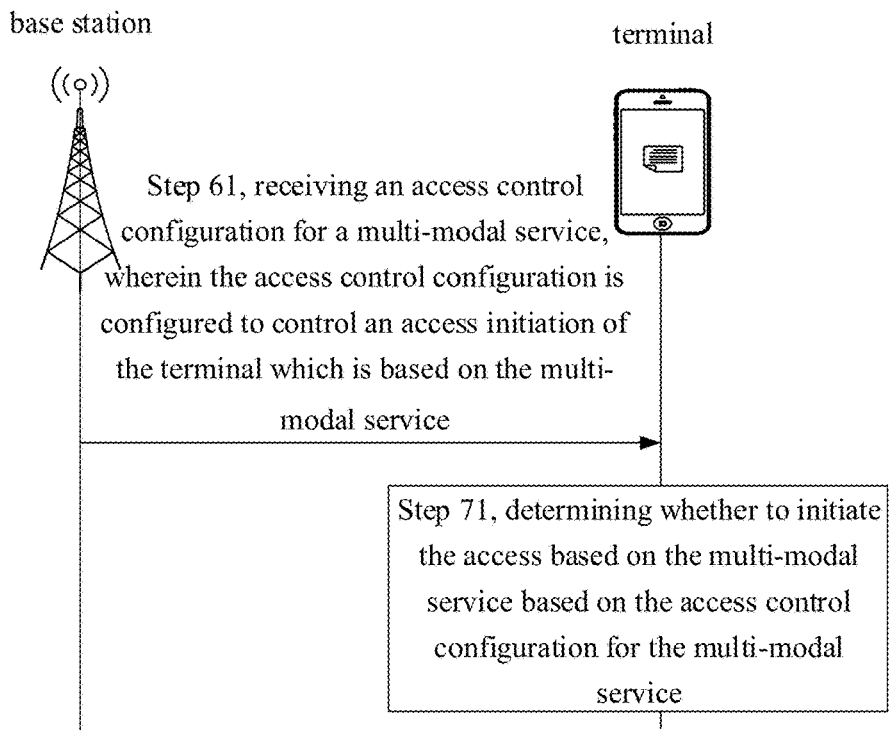
FIG. 7 is a flowchart illustrating a method for access control according to an embodiment.

As illustrated in FIG. 7, a method for access control is provided in the embodiment. The method includes the following step.

At 71, it is determined whether to initiate the access based on the multi-modal service based on the access control configuration for the multi-modal service.

In an embodiment, the first access control factor may be carried in an indication field of a system information block (SIB). When a first identifier is carried in the indication field corresponding to the first access control factor, the terminal is allowed to initiate the access based on the multi-modal service; when a second identifier is carried in the indication field corresponding to the first access control factor, the terminal is barred to initiate the access based on the multi-modal service.

In an embodiment, a cellbarred indication in the SIB is used to indicate the first access control factor. When the cellbarred indication is set as "barred", the base station is barred to initiate the access based on the multi-modal service; when the cellbarred indication is set as "notbarred", the base station is allowed to initiate the access based on the multi-modal service.

In an embodiment, an access control barring factor in the SIB is used to indicate a probability that the terminal is allowed to initiate the access based on the multi-modal service. The access control barring factor may be set as different probability values. For example, a first probability value, a second probability value and a third probability value. The probability value is within a set value range. In an embodiment, when the terminal initiates the access based on the multi-modal service, a random number may be generated within the set value range. When the random number is greater than the probability value indicated by the access control factor, the terminal is allowed to initiate the access based on the multi-modal service; when the random number is less than the probability value indicated by the access control factor, the terminal is barred to initiate the access based on the multi-modal service. In this way, the number of terminals initiating the access based on the multi-modal service may be controlled, and the load of the base station may be reduced, which ensures the wireless communication quality of the multi-modal service when the terminal initiates the multi-modal service. The value range may be set between 0 and 1. The random number may be a value randomly generated between 0 and 1, such as 0.1, 0.3 or 0.4.

Figure 8:
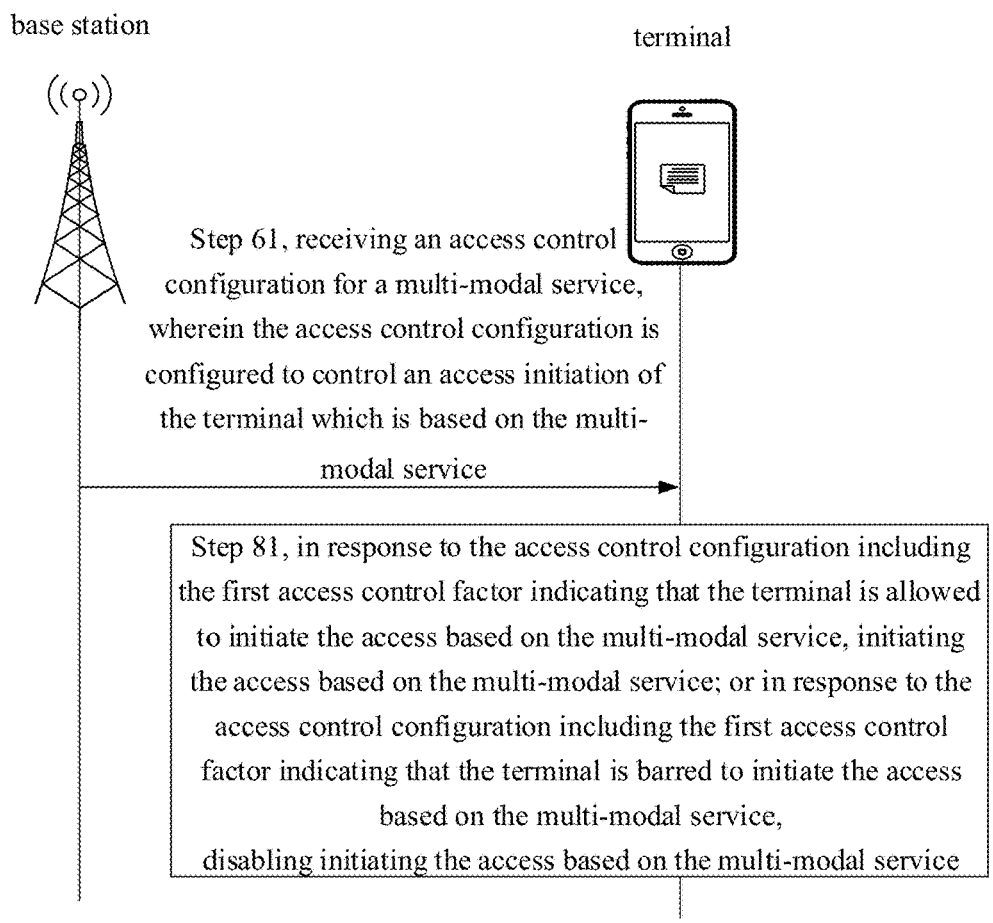
FIG. 8 is a flowchart illustrating a method for access control according to an embodiment.

As illustrated in FIG. 8, a method for access control is provided in the embodiment. Determining whether to initiate the access based on the multi-modal service based on the access control configuration for the multi-modal service at 71 includes the following step.

At 81, the access is initiated based on the multi-modal service, in response to the access control configuration including the first access control factor indicating that the terminal is allowed to initiate the access based on the multi-modal service;

or, initiating the access is disabled based on the multi-modal service, in response to the access control configuration including the first access control factor indicating that the terminal is barred to initiate the access based on the multi-modal service.

In an embodiment, the first access control factor may be carried in an indication field of the SIB. When a first identifier is carried in the indication field corresponding to the first access control factor, the access based on the multi-modal service is initiated; when a second identifier is carried in the indication field corresponding to the first access control factor, initiating the access based on the multi-modal service is disabled.

In an embodiment, a cellbarred indication in the SIB is used to indicate the first access control factor. When the cellbarred indication is set as "barred", initiating the access based on the multi-modal service is disabled; when the cellbarred indication is set as "notbarred", the access based on the multi-modal service is initiated.

Figure 9:
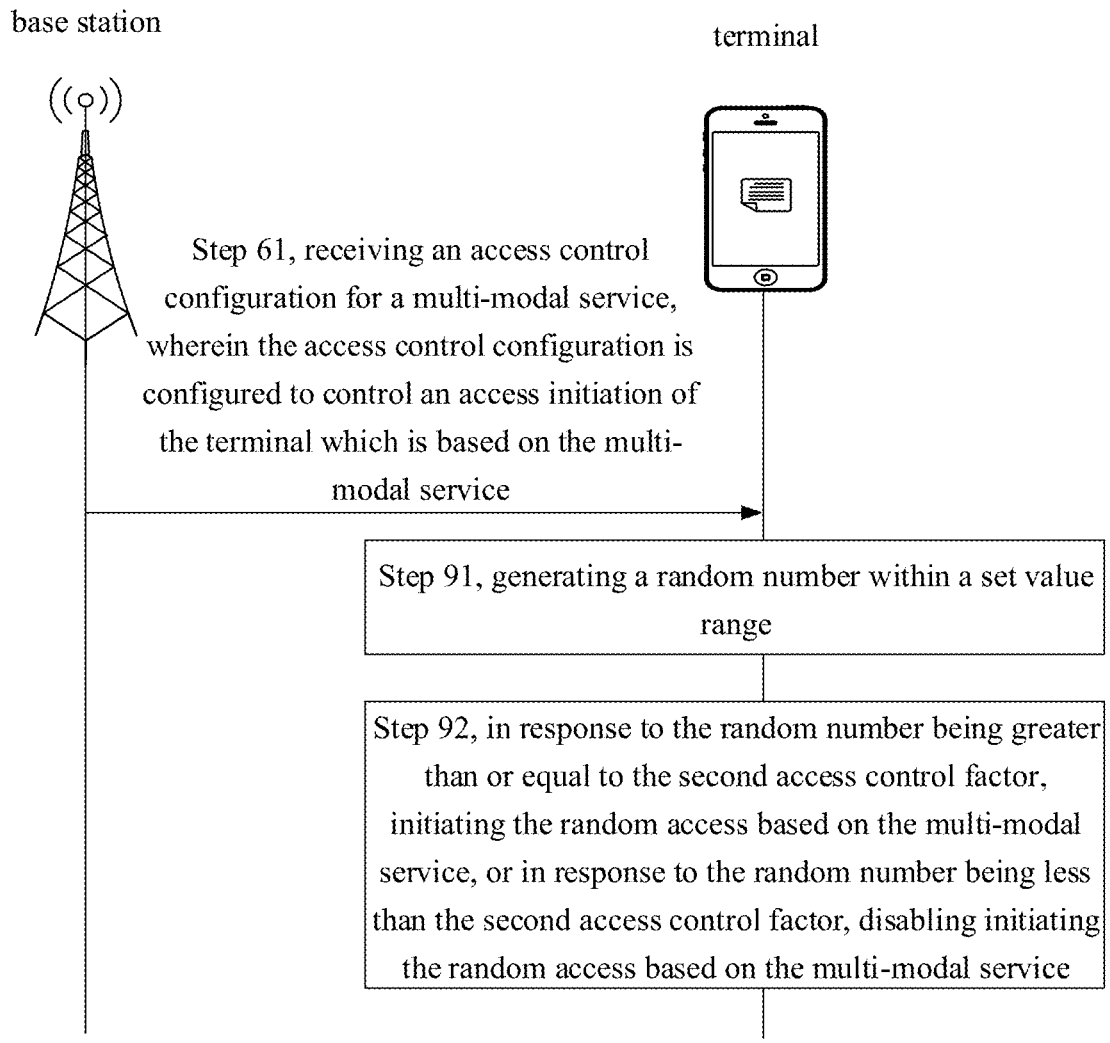
FIG. 9 is a flowchart illustrating a method for access control according to an embodiment.

As illustrated in FIG. 9, a method for access control is provided in the embodiment. In response to the access control configuration including the second access control factor, or in response to the access control configuration including the first access control factor indicating that the terminal is allowed to initiate the access based on the multi-modal service and the second access control factor, the method further includes the following steps.

At 91, a random number within a set value range is generated.

Determining whether the access based on the multi-modal service is initiated based on the access control configuration for the multi-modal service at 71 includes the step 92.

At 92, the random access based on the multi-modal service is initiated in response to the random number being greater than or equal to the second access control factor, or initiating the random access based on the multi-modal service is disabled in response to the random number being less than the second access control factor.

In an embodiment, the access control configuration including the second access control factor may mean that the access control configuration includes the second access control factor but not includes the first access control factor.

The value range may be set between 0 and 1. The random number may be a value randomly generated between 0 and 1, such as 0.1, 0.3 or 0.4.

In an embodiment, the second access control factor may be carried in the indication field of the SIB.

In an embodiment, an access control barring factor in the system information block is used to indicate the probability of the access initiation based on the multi-modal service. The access control barring factor may be set as different probability values. For example, a first probability value, a second probability value and a third probability value. The probability value is within a set value range. In an embodiment, when the terminal initiates the access based on the multi-modal service, a random number may be generated within the set value range. When the first access control factor indicates that the access initiation based on the multi-modal service is allowed and the random number is greater than the probability value indicated by the access control factor, the access based on the multi-modal service is initiated; when the first access control factor indicates that the access initiation is allowed based on the multi-modal service and the random number is less than the probability value indicated by the access control factor, initiating the access based on the multi-modal service is disabled. In this way, the number of terminals initiating the access based on the multi-modal service may be controlled, and the load of the base station may be reduced, which ensures the wireless communication quality of the multi-modal service when the terminal initiates the multi-modal service. It needs to be noted that, the terminal may disable initiating the access based on the multi-modal service when the first access control factor indicates that the access initiation based on the multi-modal service is barred.

In an embodiment, different access control factors in the access control configuration may be carried in different SIBs. For example, the first access control factor is carried in an SIB1, and the second access control factor is carried in an SIB2. The SIB1 may be sent first, and then the SIB2 may be sent. The signaling structures of the SIB1 and the SIB2 are illustrated as follows:

In an embodiment, the signaling structure of the SIB1 is:

Here, different multi-modal services may be distinguished by different identifiers. For example, "MMX" is an identifier of the first multi-modal service, and "MMY" is an identifier of the second multi-modal service. The SIB1 may include all identifiers of the multi-modal services that need to be configured and are associated with the access control configuration. For example, the SIB1 may further include an identifier "MMZ" of a third multi-modal service and an identifier "MMX" of a fourth multi-modal service. The first access control factor is carried in the SIB 1. The first access control factor of the first multi-modal service is defined by "cellBarred_MMX ENUMERATED {barred, notBarred}", and the first access control factor of the second multi-modal service is defined by "cellBarred_MMY ENUMERATED {barred, notBarred}". "barred" corresponds to indicating that the terminal is barred to initiate the access based on the multi-modal service. "notBarred" corresponds to indicating that the terminal is allowed to initiate the access based on the multi-modal service.

In an embodiment, the signaling structure of the SIB2 is:

```
SystemInformationBlockType2 ::=    SEQUENCE {
    ...
    ac-BarringForMMX               AC-BarringConfig        OPTIONAL,    -- Need OP
    ac-BarringForMMY               AC-BarringConfig        OPTIONAL     -- Need OP
}
AC-BarringConfig ::=               SEQUENCE {
    ac-BarringFactor               ENUMERATED {p00, p05, p10, p15, p20, p25, p30, p40,p50, p60, p70, p75, p80, p85, p90, p95},
    ... }
```

Here, different multi-modal services may be distinguished by different identifiers. For example, "MMX" is the identifier of the first multi-modal service, and "MMY" is the identifier of the second multi-modal service. The SIB1 may include all identifiers of the multi-modal services that need to be configured and are associated with the access control configuration. For example, the SIB1 may further include the identifier "MMZ" of the third multi-modal service and the identifier "MMX" of the fourth multi-modal service. The second access control factor is carried in the SIB2. The second access control factor of the first multi-modal service is defined by "ac-BarringForMMX AC-BarringConfig OPTIONAL, —Need OP", and the second access control factor of the second multi-modal service is defined by "ac-BarringForMMY AC-BarringConfig OPTIONAL—Need OP". The specific probability values may be selected from P00 to P95 in "ac-BarringFactor ENUMERATED {p00, p05, p10, p15, p20, p25, p30, p40, p50, p60, p'70, p'75, p80, p85, p90, p95}".

In an embodiment, different access control factors in the access control configuration may be carried in the same SIB. For example, the first access control factor and the second access control factor are carried in the SIB1, the signaling structure of which is illustrated:

```
SystemInformationBlockType1 ::=    SEQUENCE {
    ...
    cellBarred_MMX                 ENUMERATED {barred, notBarred},
    cellBarred_MMY                 ENUMERATED {barred, notBarred},
    ...   }
```

In an embodiment, the signaling structure of the SIB1 is:

```
SystemInformationBlockType1 ::=    SEQUENCE {
    ...
        cellBarred_MMX                              ENUMERATED {barred, notBarred},
        cellBarred_MMY                              ENUMERATED {barred, notBarred},
    ...
        ac-BarringForMMX         AC-BarringConfig          OPTIONAL,    -- Need OP
        ac-BarringForMMY         AC-BarringConfig          OPTIONAL     -- Need OP
    ...
    ac-BarringFactor                    ENUMERATED {p00, p05, p10, p15, p20, p25, p30, p40,p50, p60, p70, p75,
p80, p85, p90, p95},  }
```

Here, different multi-modal services may be distinguished by different identifiers. For example, "MMX" is the identifier of the first multi-modal service, and "MMY" is the identifier of the second multi-modal service. The SIB1 may include all identifiers of the multi-modal services that need to be configured and are associated with the access control configuration. For example, the SIB1 may further include the identifier "MMZ" of the third multi-modal service and the identifier "MMX" of the fourth multi-modal service. The first access control factor is carried in the SIB1. The first access control factor of the first multi-modal service is defined by "cellBarred_MMX ENUMERATED {barred, notBarred}", and the first access control factor of the second multi-modal service is defined by "cellBarred_MMY ENUMERATED {barred, notBarred}". "barred" corresponds to indicating that the terminal is barred to initiate the access based on the multi-modal service. "notBarred" corresponds to indicating that the terminal is allowed to initiate the access based on the multi-modal service. The second access control factor is carried in the SIB1. The second access control factor of the first multi-modal service is defined by "ac-BarringForMMX AC-BarringConfig OPTIONAL, —Need OP", and the second access control factor of the second multi-modal service is defined by "ac-BarringForMMY AC-BarringConfig OPTIONAL—Need OP". The specific probability values may be selected from P00 to P95 in "ac-BarringFactor ENUMERATED {p00, p05, p10, p15, p20, p25, p30, p40, p50, p60, p'70, p'75, p80, p85, p90, p95}".

Figure 10:
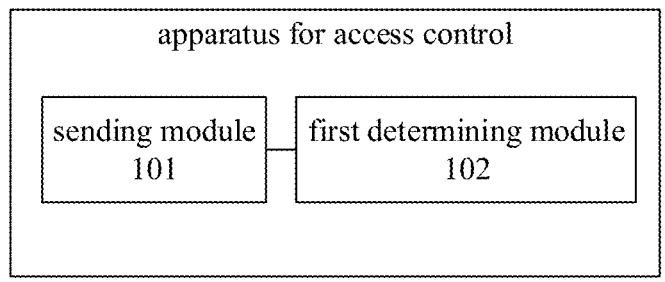
FIG. 10 is a diagram illustrating an apparatus for access control according to an embodiment.

As illustrated in FIG. 10, an apparatus for access control is provided in the embodiment, which is applied to a base station. The apparatus includes a sending module 101.

The sending module 101 is configured to send an access control configuration for a multi-modal service.

The access control configuration is configured to control the access initiation of the terminal which is based on the multi-modal service.

In an embodiment, an effective scope of the access control configuration for the multi-modal service is: an area including one or more cells.

In an embodiment, the area including one or more cells is a signal coverage area of a public land mobile network (PLMN).

In an embodiment, the access control configuration for multi-modal service includes:
a first access control factor, the first access control factor indicating that the terminal is allowed to initiate an access based on the multi-modal service or the first access control factor indicating that the terminal is barred to initiate an access based on the multi-modal service;
and/or,
a second access control factor, the second access control factor indicating a probability that the terminal is allowed to initiate an access based on the multi-modal service.

In an embodiment, the apparatus further includes a first determining module 102.

The first determining module 102 is configured to: determine the access control configuration for the multi-modal service based on a network load condition.

In an embodiment, the first determining module 102 is further configured to perform at least one of:
determining that the access control configuration includes the first access control factor indicating that the terminal is allowed to initiate the access based on the multi-modal service, in response to determining that a network provides the multi-modal service based on the network load condition;
determining that the access control configuration includes the first access control factor indicating that the terminal is barred to initiate the access based on the multi-modal service, in response to determining that a network does not provide the multi-modal service based on the network load condition;
determining that the access control configuration includes the second access control factor, in response to that a network provides a part of the multi-modal service based on the network load condition; or
determining that the access control configuration includes the first access control factor indicating that the terminal is allowed to initiate the access based on the multi-modal service and the second access control factor, in response to determining that a network provides a part of the multi-modal service based on the network load condition.

In an embodiment, the sending module 101 is further configured to send the access control configuration for the multi-modal service through a system information block.

Figure 11:
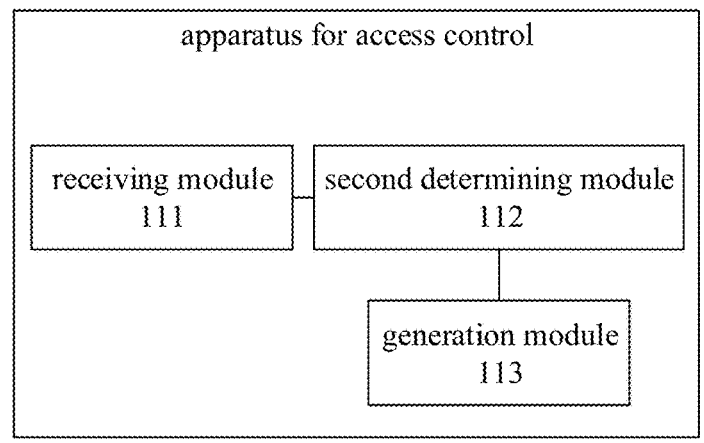
FIG. 11 is a diagram illustrating an apparatus for access control according to an embodiment.

As illustrated in FIG. 11, an apparatus for access control is provided in the embodiment, which is applied to a terminal. The apparatus includes a receiving module 111.

The receiving module 111 is configured to receive an access control configuration for a multi-modal service.

The access control configuration is configured to control an access initiation of a terminal which is based on the multi-modal service.

In an embodiment, an effective scope of the access control configuration for the multi-modal service is: an area including one or more cells.

In an embodiment, the area including one or more cells is a signal coverage area of a public land mobile network (PLMN).

In an embodiment, the access control configuration for the multi-modal service includes:
a first access control factor, the first access control factor indicating that the terminal is allowed to initiate an access based on the multi-modal service or the first access control factor indicating that the terminal is barred to initiate an access based on the multi-modal service;

and/or, a second access control factor, the second access control factor indicating a probability that the terminal is allowed to initiate an access based on the multi-modal service.

In an embodiment, the apparatus further includes a second determining module 112. The second determining module 112 is configured to determine whether an access based on the multi-modal service is initiated according to the access control configuration for the multi-modal service.

In an embodiment, the second determining module 112 is further configured to:

initiate the access based on the multi-modal service, in response to the access control configuration including the first access control factor indicating that the terminal is allowed to initiate the access based on the multi-modal service;

or, disable initiating the access based on the multi-modal service, in response to the access control configuration including the first access control factor indicating that the terminal is barred to initiate the access based on the multi-modal service.

In an embodiment, in response to the access control configuration including the second access control factor, or in response to the access control configuration including the first access control factor indicating that the terminal is allowed to initiate the access based on the multi-modal service and the second access control factor, the apparatus further includes a generation module 113.

The generation module 113 is configured to generate a random number within a set value range.

The second determining module 112 is further configured to:

initiate the random access based on the multi-modal service in response to the random number being greater than or equal to the second access control factor, or disable initiating the random access based on the multi-modal service in response to the random number being less than the second access control factor.

In an embodiment, the receiving module 111 is further configured to receive the access control configuration for the multi-modal service through a system information block.

With regard to the apparatus in the above embodiments, the specific way in which each module performs the operation has been described in detail in the embodiments of the method and will not be elaborated here.

A communication device is provided in the embodiments of the disclosure, which includes:

a processor; and a memory configured to store instructions executable by the processor;

the processor is configured to: implement the method described in the above any embodiment when the instructions are executed.

The processor may include various types of storage mediums. The storage medium is a non-transitory computer storage medium, and may continue memorizing the information stored on the medium when a communication device is powered off.

The processor is connected to a memory via a bus, for reading an executable program stored on the memory.

A computer storage medium stored with a computer executable program is further provided in the embodiments of the present disclosure. The program implements the method as described in the above any embodiment when executed by a processor.

With regard to the apparatus in the above embodiments, the specific way in which each module performs the operation has been described in detail in the embodiments of the method, which will not be elaborated here.

Figure 12:
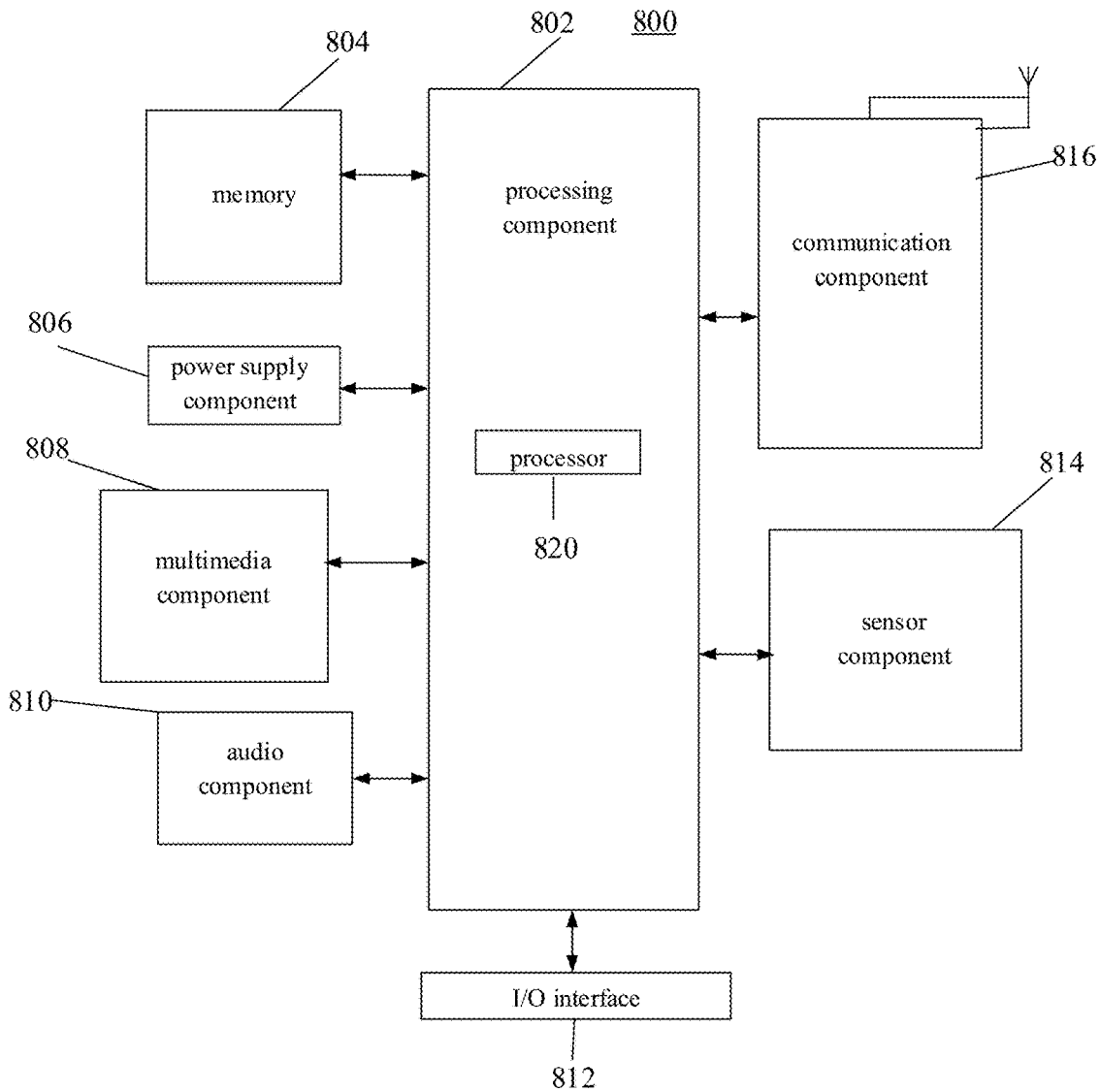
FIG. 12 is a block diagram illustrating a terminal according to an embodiment.

FIG. 12 is a block diagram illustrating a user equipment (UE) 800 according to an embodiment. For example, the UE 800 may be a mobile phone, a computer, a digital broadcasting UE, a messaging device, a game console, a tablet device, a medical device, a fitness device, a personal digital assistant, etc.

As illustrated in FIG. 12, the UE 800 may include one or more components: a processing component 802, a memory 804, a power supply component 806, a multimedia component 808, an audio component 810, an input/output (I/O) interface 812, a sensor component 814, and a communication component 816.

The processing component 802 generally controls the whole operation of the UE 800, such as the operations related to display, phone call, data communication, camera operation and recording operation. The processing component 802 may include one or more processors 820 to perform instructions, to complete all or part of steps of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the UE 800. Examples of the data include the instructions of any applications or methods operated on the UE 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 may provide power for all components of the UE 800. The power supply component 806 may include a power supply management system, one or more power supplies, and other units related to generating, managing and distributing power for the UE 800.

The multimedia component 808 includes an output interface screen provided between the UE 800 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touch or slide operation. In some embodiments, the multimedia component 808 includes a front camera and/or a rear camera. When the UE 800 is in operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 810 is configured as an output and/or input signal. For example, the audio component 810 includes a microphone (MIC). When the UE 800 is in operation mode, such as a call mode, a record mode, and a speech recognition mode, the microphone is configured to receive the external audio signals. The audio signals received may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The buttons may include but not limited to a home button, a volume button, a start button and a lock button.

The sensor component 814 includes one or more sensors, configured to provide various aspects of status assessment for the UE 800. For example, the sensor component 814 may detect the on/off state of the UE 800 and the relative positioning of the component. For example, the component is a display and a keypad of the UE 800. The sensor component 814 may further detect the location change of the UE 800 or the location change of one component of the UE 800, the presence or absence of contact between the user and the UE 800, the orientation or acceleration/deceleration of the UE 800, and the temperature change of the UE 800. The sensor component 814 may include a proximity sensor, which is configured to detect the existence of the objects nearby without any physical contact. The sensor component 814 may further include a light sensor such as a CMOS or CCD image sensor for use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the UE 800 and other devices. The UE 800 may access wireless networks based on communication standard, such as WiFi, 2G or 3G, or their combination. In an embodiment, the communication component 816 receives broadcast signals or broadcast-related information from an external broadcast management system via a broadcast channel. In an example embodiment, the communication component 816 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an example embodiment, the UE 800 may be implemented by one or more application specific integrated circuits(ASIC), digital signal processors (DSPs), digital signal processing devices (DSPDs), programmable logic devices (PLDs), field programmable gate arrays (FPGAs), controllers, microcontrollers, microprocessors or other electronics components, which is configured to perform the above method.

In an example embodiment, a non-transitory computer readable storage medium is further provided which includes instructions, such as the memory 804 including instructions, in which the instructions may be executed by the processor 820 of the UE 800 to complete the above methods. For example, the non-transitory computer readable storage medium may be a ROM, a random access memory (RAM), a CD-ROM, a magnetic tape, a floppy disk, an optical data storage device, etc.

Figure 13:
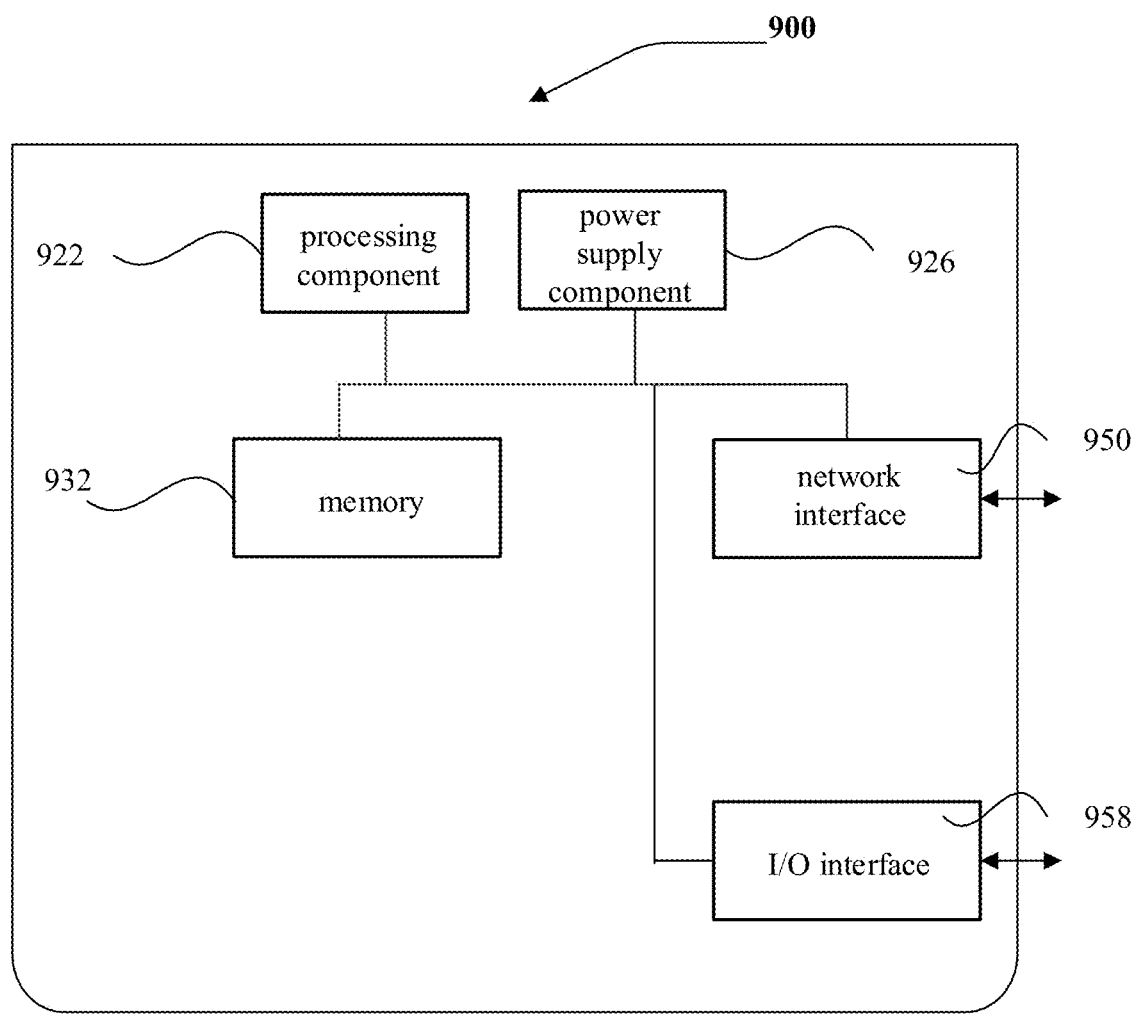
FIG. 13 is a block diagram illustrating a base station according to an embodiment.

FIG. 13 is a block diagram illustrating a structure of a base station according to an embodiment of the disclosure. For example, a base station 900 may be provided as a network-side server. As illustrated in FIG. 13, the base station 900 includes a processing component 922, which further include one or more processors, and memory resources represented by a memory 932, which are configured to store instructions executable by the processing component 922, for example, an application. The application stored in the memory 932 may include one or more modules each of which corresponds to a set of instructions. In addition, the processing component 922 is configured to execute instructions, to perform any one of the methods applied to the base station as described above.

The base station 900 may further include one power supply component 926 configured to execute power management of the base station 900, one wired or wireless network interface 950 configured to connect the base station 900 to a network, and one input/output(I/O) interface 958. The base station 900 may operate an operating system stored in the memory 932, for example, Windows Server™, Mac OS X™, Unix™, Linux™, FreeBSD™ or the like.

After considering the specification and practicing the disclosure herein, those skilled in the art will easily think of other implementations. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only.

It should be understood that the present invention is not limited to the precise structure described above and shown in the drawings, and various modifications and changes may be made without departing from its scope. The scope of the present application is only limited by the appended claims.

What is claimed is:

1. A method for access control, comprising:
   sending, by a base station, an access control configuration for a multi-modal service; and
   determining the access control configuration for the multi-modal service based on a network load condition;
   wherein the access control configuration is configured to control an access initiation of a terminal, wherein the access initiation of the terminal is based on the multi-modal service;
   wherein determining the access control configuration for the multi-modal service based on the network load condition comprises at least one of:
   determining that the access control configuration comprises a first access control factor indicating that the terminal is allowed to initiate an access based on the multi-modal service, in response to determining that a network provides the multi-modal service based on the network load condition;
   determining that the access control configuration comprises the first access control factor indicating that the terminal is barred to initiate the access based on the multi-modal service, in response to determining that the network does not provide the multi-modal service based on the network load condition;
   determining that the access control configuration comprises a second access control factor, in response to determining that the network provides a part of the multi-modal service based on the network load condition; or determining that the access control configuration comprises the first access control factor indicating that the terminal is allowed to initiate the access based on the multi-modal service, and the second access control factor, in response to determining that the network provides a part of the multi-modal service based on the network load condition.

2. The method according to claim 1, wherein an effective scope of the access control configuration for the multi-modal service is: an area comprising one or more cells.

3. The method according to claim 2, wherein the area comprising one or more cells is a signal coverage area of a public land mobile network (PLMN).

4. The method according to claim 1, wherein the access control configuration for the multi-modal service comprises at least one of:
the first access control factor, the first access control factor indicating that the terminal is allowed to initiate the access based on the multi-modal service or the first access control factor indicating that the terminal is barred to initiate the access based on the multi-modal service;
or,
the second access control factor, the second access control factor indicating a probability that the terminal is allowed to initiate the access based on the multi-modal service.

5. The method according to claim 1, further comprising:
sending the access control configuration for the multi-modal service through a system information block.

6. A method for access control, comprising:
receiving, by a terminal, an access control configuration for a multi-modal service;
wherein the access control configuration is configured to control an access initiation of the terminal, wherein the access initiation of the terminal is based on the multi-modal service;
wherein in a case that a network provides the multi-modal service based on a network load condition, the access control configuration comprises a first access control factor indicating that the terminal is allowed to initiate the access based on the multi-modal service; in a case that the network does not provide the multi-modal service based on the network load condition, the access control configuration comprises a first access control factor indicating that the terminal is barred to initiate the access based on the multi-modal service; in a case that the network provides a part of the multi-modal service based on the network load condition, the access control configuration comprises a second access control factor; in a case that the network provides a part of the multi-modal service based on the network load condition, the access control configuration comprises the first access control factor indicating that the terminal is allowed to initiate the access based on the multi-modal service, and the second access control factor.

7. The method according to claim 6, wherein an effective scope of the access control configuration for the multi-modal service is: an area comprising one or more cells.

8. The method according to claim 7, wherein the area comprising one or more cells is a signal coverage area of a public land mobile network (PLMN).

9. The method according to claim 8, wherein the access control configuration for the multi-modal service comprises at least one of:
the first access control factor, the first access control factor indicating that the terminal is allowed to initiate the access based on the multi-modal service or the first access control factor indicating that the terminal is barred to initiate the access based on the multi-modal service;
or,
the second access control factor, the second access control factor indicating that a probability that the terminal is allowed to initiate the access based on the multi-modal service.

10. The method according to claim 9, further comprising:
determining whether to initiate an access based on the multi-modal service according to the access control configuration for the multi-modal service.

11. The method according to claim 10, wherein determining whether to initiate the access based on the multi-modal service according to the access control configuration for the multi-modal service comprises:
initiating the access based on the multi-modal service, in response to the access control configuration comprising the first access control factor indicating that the terminal is allowed to initiate the access based on the multi-modal service;
or,
disabling initiating the access based on the multi-modal service, in response to the access control configuration comprising the first access control factor indicating that the terminal is barred to initiate the access based on the multi-modal service.

12. The method according to claim 10, wherein in response to the access control configuration comprising the second access control factor, or in response to the access control configuration comprising the first access control factor indicating that the terminal is allowed to initiate the access based on the multi-modal service and the second access control factor, the method further comprises:
generating a random number within a set value range;
wherein determining whether to initiate the access based on the multi-modal service according to the access control configuration for the multi-modal service comprises:
initiating the access based on the multi-modal service in response to the random number being greater than or equal to the second access control factor, or disabling initiating the access based on the multi-modal service in response to the random number being less than the second access control factor.

13. The method according to claim 6, further comprising:
receiving the access control configuration for the multi-modal service through a system information block (SIB).

14. A communication device, comprising:
an antenna;
a memory for storing computer instructions; and
at least one processor connected to the antenna and the memory, and configured to control transceiving of the antenna;
wherein when the computer instructions are executed by the at least one processor, the at least one processor is caused to:
receive an access control configuration for a multi-modal service, wherein the access control configuration is configured to control an access initiation of the communication device, wherein the access initiation of the terminal is based on the multi-modal service;

wherein in a case that a network provides the multi-modal service based on a network load condition, the access control configuration comprises a first access control factor indicating that the terminal is allowed to initiate the access based on the multi-modal service; in a case that the network does not provide the multi-modal service based on the network load condition, the access control configuration comprises a first access control factor indicating that the terminal is barred to initiate the access based on the multi-modal service; in a case that the network provides a part of the multi-modal service based on the network load condition, the access control configuration comprises a second access control factor; in a case that the network provides a part of the multi-modal service based on the network load condition, the access control configuration comprises the first access control factor indicating that the terminal is allowed to initiate the access based on the multi-modal service, and the second access control factor.

15. A non-transitory computer storage medium stored with computer instructions, wherein when the computer instructions are executed by a processor, the method of claim 6 is implemented.

16. A base station, comprising:
   an antenna;
   a memory for storing computer instructions; and
   at least one processor connected to the antenna and the memory, and configured to control transceiving of the antenna;
   wherein when the computer instructions are executed by the at least one processor, the at least one processor is caused to implement the method of claim 1.

17. A non-transitory computer storage medium stored with computer instructions, wherein when the computer instructions are executed by a processor, the method of claim 1 is implemented.

* * * * *